(12) United States Patent
Joseph et al.

(10) Patent No.: US 7,930,712 B1
(45) Date of Patent: Apr. 19, 2011

(54) APPARATUS AND METHOD FOR PROCESSING CONTENT SIGNALS FROM MULTIPLE SIGNAL SOURCES

(75) Inventors: Kuriacose Joseph, Gaithersburg, MD (US); Walter Kepley, Gaithersburg, MD (US); Brian Michael Scally, Damascus, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1816 days.

(21) Appl. No.: 10/209,165

(22) Filed: Sep. 20, 2002

Related U.S. Application Data (60) Provisional application No. 60/337,008, filed on Nov. 8, 2001.

(51) Int. Cl.
*H04N 7/167* (2006.01)

(52) U.S. Cl. ............ 725/31; 725/25; 725/26; 725/27; 725/28; 725/29; 725/30; 725/86; 725/101; 380/211; 380/212; 713/150

(58) Field of Classification Search .............. 725/25–31, 725/86, 101; 380/200–242; 713/150
See application file for complete search history.

(56) References Cited

U.S. PATENT DOCUMENTS

| | | | |
|---|---|---|---|
| 5,828,945 A * | 10/1998 | Klosterman | 455/42 |
| 6,069,647 A * | 5/2000 | Sullivan et al. | 725/29 |
| 6,115,080 A * | 9/2000 | Reitmeier | 348/731 |
| 6,201,536 B1 * | 3/2001 | Hendricks et al. | 715/716 |
| 6,348,932 B1 * | 2/2002 | Nishikawa et al. | 715/719 |
| 6,393,128 B1 * | 5/2002 | Rix et al. | 380/283 |
| 6,522,865 B1 * | 2/2003 | Otten | 455/13.1 |
| 6,757,909 B1 * | 6/2004 | Maruo et al. | 725/111 |
| 6,772,434 B1 * | 8/2004 | Godwin | 725/68 |
| 6,973,662 B1 * | 12/2005 | Sie et al. | 725/25 |
| 7,039,614 B1 * | 5/2006 | Candelore | 705/57 |
| 7,194,753 B1 * | 3/2007 | Fries et al. | 725/38 |
| 7,203,314 B1 * | 4/2007 | Kahn et al. | 380/239 |
| 2002/0129374 A1 * | 9/2002 | Freeman et al. | 725/91 |
| 2007/0172061 A1 * | 7/2007 | Pinder | 380/240 |

* cited by examiner

*Primary Examiner* — Brian T Pendleton
*Assistant Examiner* — Nnenna Ekpo (57) ABSTRACT

An apparatus and method for processing content signals received from a plurality of different, and possibly dissimilar, signal sources, such as different satellite networks, and providing a display based on the content of those signals. The apparatus includes a tuner/demodulator for receiving content signals and demodulating the received content signals as programming bitstreams, and one or more access control devices for descrambling any conditional access present in the demodulated programming bitstreams. The apparatus further includes a processor, such as a system chip, which is responsible for all command and control functions. The system chip evaluates conditional access to determine whether the bitstream needs decryption, descrambling, or both, and processes a bitstream from one of the multiple signal sources for display on a suitable output device.

42 Claims, 6 Drawing Sheets

APPARATUS AND METHOD FOR PROCESSING CONTENT SIGNALS FROM MULTIPLE SIGNAL SOURCES

CROSS REFERENCE TO RELATED APPLICATIONS

The present invention claims the benefit of priority under 35 U.S.C. §119(e) to U.S. Provisional Patent Application No. 60/337,008 of Kuriacose Joseph et al., entitled "A JOINT DIRECTV-ECHOSTAR SIMULCRYPT SYSTEM," filed on Nov. 8, 2001, the entire contents of which is incorporated by reference herein.

BACKGROUND OF THE INVENTION

1. Field of the Invention

The present invention generally relates to a system and method which is adapted for use with multiple satellite-based distribution networks. More particularly, the invention is directed to an apparatus and method for processing content signals received from a plurality of different, and possibly dissimilar, signal sources, such as different satellite networks.

2. Description of the Related Art

Conventional communications systems may include a receiver for receiving and processing transmitted waveforms. For example, in a satellite communications system, the receiver may include a small satellite dish connected by a cable to a set-top box (STB) or an integrated receiver-decoder (IRD), both being referred to generally herein as an STB, which are used as interchangeable terms in the art. The satellite dish is aimed toward the satellite, and the STB is connected to the user's television in a similar fashion to a conventional cable-TV decoder.

A micro-controller controls the overall operation of the STB, including the selection of parameters, the set-up and control of components, channel selection, viewer access to different programming packages, blocking of certain channels, and many other functions. The compression and decompression of packetized video signals may be accomplished according to the Motion Picture Expert Group (MPEG) standards and the compression and decompression of audio signals may be accomplished according to the Motion Picture Expert Group (MPEG) standards, DOLBY DIGITAL® (or AC-3) standards, DTS or other known standards. The conventional STB therefore typically includes video and audio decoders in order to decompress the received compressed video and audio. The STB may output video and audio data to a number of destinations, including additional audio and video decoders, as well as ports, memories, and interface devices, such as a digital VHS (DVHS) interface. The STB may also send the same audio and video data to different destinations.

Currently, these STBs (or IRDs) are configured so as to interface with a specific network or system. For example, a DIRECTV® receiver cannot be used in a DISH Network® system, and vice versa. One problem is that each network has it own networking standard, including specific conditional access protocol, bitstream scrambling algorithms, transport format, and audio and video encoding and decoding standards to conform to. As the content provider community shrinks and corporations with dissimilar systems merge, the costs in merging two or more networks becomes a significant issue.

Assuming that such a merger results in a single surviving system, a problem remains with regard to transitioning the users of the now defunct system to the surviving system. For example, the equipment of the system that will no longer exist after the merger will become obsolete unless provisions are taken to make the equipment compatible with the surviving system prior to the transition. Furthermore, the equipment may also have to handle a transition scenario where multiple broadcast systems are active, and the equipment must therefore be capable of receiving and processing signals from both systems. In addition, during the transition period, both systems may still be active, with some channels being broadcast only on one system and other channels only on the other system.

The concepts of simulcrypt and multicrypt that have been devised for digital video broadcast (DVB) systems are not necessarily suitable solutions for the system transition scenarios described above. However, they are concepts that may be used in building equipment to handle the transition. The goal is to allow a single piece of equipment to receive content from multiple service providers. As defined in the digital video broadcast (DVB) environment, the same algorithm for the scrambling of bitstreams is used by simulcrypt systems, while for multicrypt systems, different algorithms can be used to scramble the bit streams for the different systems. In both multicrypt and simulcrypt systems, the same modulation subsystems, transport subsystems, as well as the same audio and video subsystems, are expected for the multiple service providers.

Accordingly, a need exists for a suitable apparatus and method for processing content signals received from a plurality of different, and possibly dissimilar, signal sources, such as different satellite networks, to thus enable a single STB to handle signals from multiple networks that may use different scrambling algorithms and different transport, audio and video subsystems.

SUMMARY OF THE INVENTION

In an effort to solve the above-noted problems, the present invention provides an apparatus that processes content signals received from multiple, and possibly dissimilar signal sources. The apparatus and method employs one or more tuner/demodulators for receiving content signals and for demodulating the received content signals to generate bitstreams containing programming information, and one or more access control devices for processing conditional access information present in the demodulated bitstreams. The apparatus and method further employs a system chip responsible for all command and control functions. For example, the system chip determines the signal source whose bitstream is being processed, activates the appropriate conditional access processing (which may also include descrambling, if appropriate) and processes a bitstream from one of the multiple signal sources for decoding and display on a suitable output device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not intended to limit the scope of the present invention, and wherein.

DETAILED DESCRIPTION OF THE PREFERRED EMBODIMENTS

Television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas. An example of a land-based "cellular" type television signal distribution system is disclosed in Bossard, U.S. Pat. No. 4,747,160, the entire contents of which being incorporated herein by reference. This system includes multiple television signal transmitting stations, each of which transmits a television signal to individual receivers spread throughout a limited geographic region, and is configured so that adjacent transmitting stations use modulation and frequency diversity to prevent interference.

Some cellular systems, such as those commonly referred to as LMDS (local multi-point distribution system) and MMDS (multi-channel, multi-point distribution system), use a land-based cellular-type transmitting setup to rebroadcast satellite signals at frequencies different than the frequencies used by the satellite. Each of the transmitters of an LMDS system typically transmits within a one to five mile radius cell while each of the transmitters of an MMDS system typically transmits within an approximately 30-mile radius cell.

The present invention may be embodied in a satellite-based distribution system. The system generally includes an earth station that compiles a number of programs (video and audio) into a broadband signal, modulates a carrier frequency band with the broadband signal and then transmits (uplinks) the modulated signal to a geosynchronous satellite via a transmit antenna. The satellite amplifies the received signal, shifts the signal to a different carrier frequency band and transmits (downlinks) the frequency shifted signal to earth for reception at individual receiver stations.

The uplink and downlink broadband signals of the disclosed satellite distribution system may be divided into a plurality of transponder signals, each having a plurality of individual channels. Satellite systems may also broadcast a set of transponder signals at multiple polarizations, for example, a right-hand circular polarization (RHCP) and a left-hand circular polarization (LHCP), within the band of carrier frequencies associated with the satellite; effectively doubling the number of channels broadcast by the system.

Satellite-based signal distribution systems exist for many frequency bands, including the so-called "Ku-band" which ranges from approximately 12 GHz to approximately 18 GHz. An embodiment of the present invention uses an uplink signal having 16 RHCP transponder signals and 16 LHCP transponder signals modulated into the frequency band between about 17.2 GHz and about 17.7 GHz. Each of these 32 transponder signals includes data packets related to approximately 10 individual television channels associated therewith. The satellites shift the uplink transponder signals to carrier frequencies ranging from approximately 11.7 GHz to approximately 12.2 GHz and transmit these frequency-shifted transponder signals back to earth for reception at each of a plurality of individual receiver stations.

Each receiver station may include an antenna coupled to an apparatus such as a set top box (STB) or integrated receiver-decoder (IRD). In one embodiment, the apparatus may have interface circuitry coupled thereto for connection to an external digital peripheral unit such as a storage medium. The antenna may comprise a parabolic dish antenna such as an outdoor unit (ODU) for example, pointed in the general direction of the transmitting satellite (or other transmitting location) to thereby receive the broadband signal. Such antennas may also include a low-noise block (LNB) downconverter, which filters and shifts the incoming signal to an intermediate frequency band, such as L-band, which is between approximately 1.0 GHz and approximately 2.0 GHz. In one embodiment, the signal received from the satellite is shifted to the frequency band between approximately 950 MHz and approximately 1450 MHz.

Sometimes, only the RHCP transponder signals or the LHCP transponder signals are mixed down to L-band, depending on which channel a user is viewing. However, in systems having a two-channel LNB downconverter, both the RHCP and the LHCP transponder signals are shifted down to L-band and provided, via separate lines, to the receiver station.

Although the present invention will be explained in reference to an apparatus within a system, the apparatus may function within any of a cable TV, off-air broadcast or other applicable or known and used communication-related and/or wireless digital-TV system. Additionally, the apparatus may be physically embodied as the above-noted set top box (STB) or integrated receiver-decoder (IRD), and/or operatively connected to various components in a subscriber's home, office, automobile, aircraft, sea-going vessel, etc. Alternatively, the apparatus may be operatively connected to, or subsumed within, a digital video recorder (DVR) of the subscriber.

Figure 1:
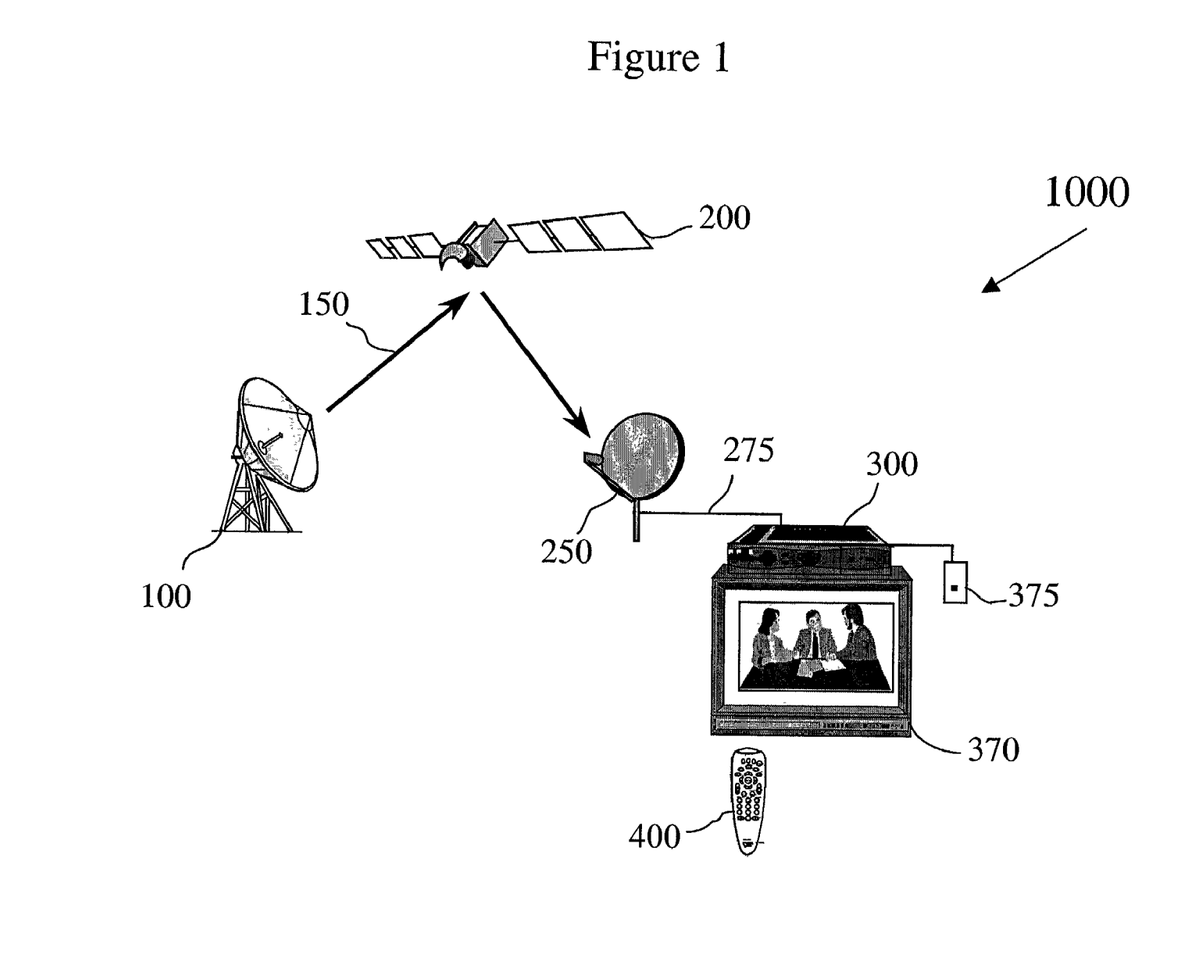
FIG. 1 is a conceptual block diagram illustrating an exemplary satellite-based distribution system for use with an apparatus for processing content signals received from a plurality of different, and possibly dissimilar, signal sources according to an embodiment of the present invention.

FIG. 1 is an exemplary satellite-based distribution system with which an STB or IRD according to an embodiment of the present invention can be used. In the exemplary embodiment of FIG. 1, the system 1000 may comprise one or more transmit antenna stations (hereinafter referred to as uplink facility 100 for clarity), satellite 200, one or more receive antennas 250 and apparatus 300.

The transmit antenna station may be a DIRECTV® or DISH NETWORK® satellite uplink facility, for example, or any other earth station as described above, or which is well known in the art. The bitstream or airlink 150 is a suitable content signal such as a digital audio and video television data signal (A/V signal), the medium is a satellite 200, and the receive antenna 250 is preferably an outdoor unit (ODU). As illustrated in FIG. 1, the ODU is connected to apparatus 300 via coaxial cable 275.

As will be described in further detail below, apparatus 300 will be receiving at least two, and up to N different content signals from multiple different signals sources, such as from two or more networks in system, 1000. Accordingly, apparatus 300 may be operatively connected to two or more ODU 250's.

In this exemplary embodiment, apparatus 300 preferably has a system chip microprocessor configuration, but may also have a multiple-processor configuration. Apparatus 300 may further be connected to a display 370, such as a standard definition television, a high definition television or a PC monitor and also may be connected to a telephone line 375. The apparatus 300 may be controlled via a remote control 400 as is well known in art, using known RF and/or IR transmission and reception techniques.

The user command interface in the present invention however is not limited to a remote control device. Alternatively, any of function buttons residing on the apparatus 300 structure itself, a keyboard operatively connected thereto and/or connected to a PC that is in communication with the apparatus 300, USB serial ports, voice-activation software devices within or operatively connected to the apparatus 300, or command and/or instructions by remote call-in using DTMF tones for example, may be substituted as the user command interface to the apparatus 300.

Figure 2:
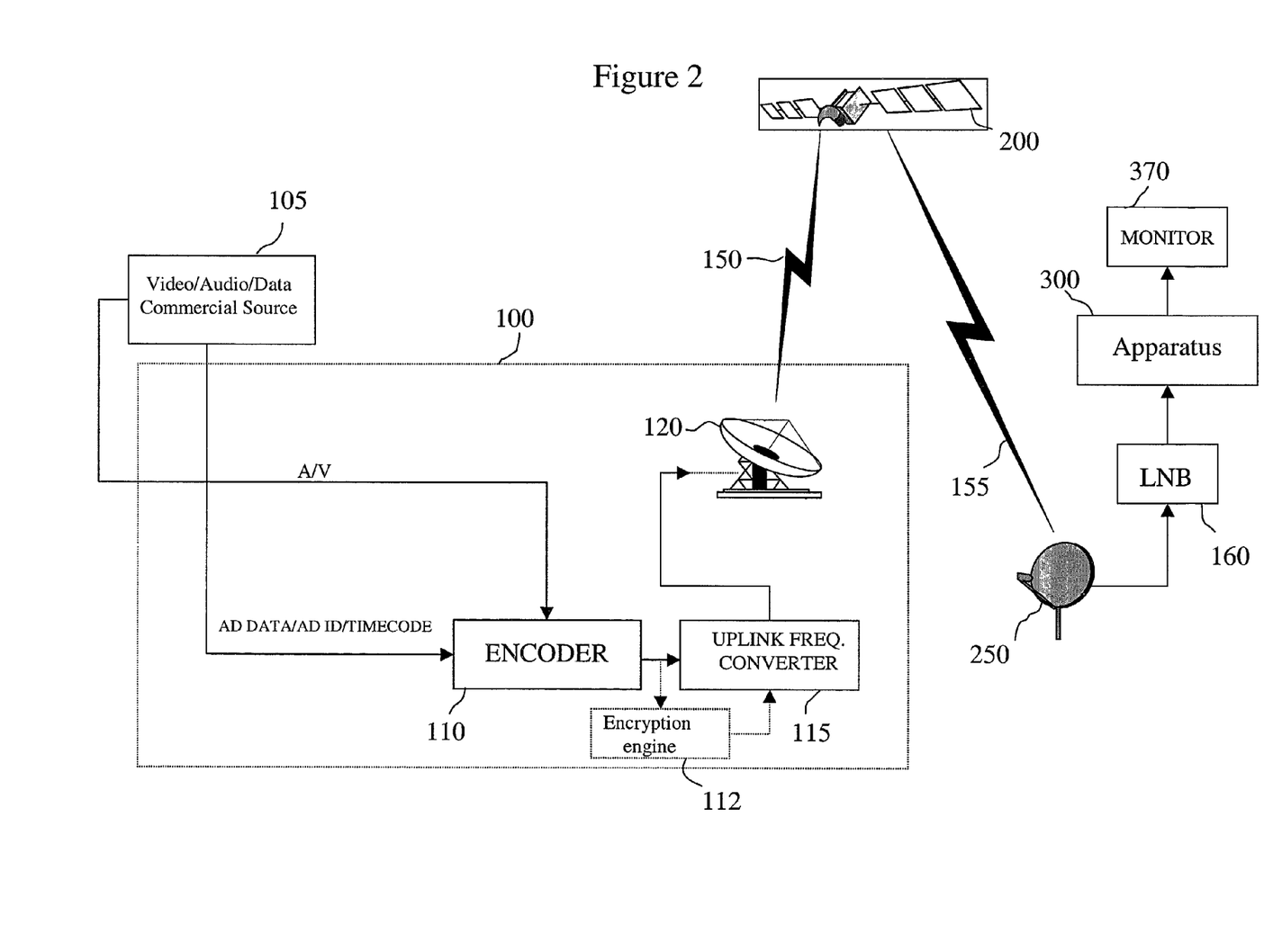
FIG. 2 is a conceptual block diagram showing further details of the system shown in FIG. 1, including an example of the flow of data from the content provider to the apparatus.

FIG. 2 illustrates a general data flow of the system in accordance with the invention. In operation, the uplink facility 100, or "headend configuration" as known in the art, can receive video and audio programming from a number of sources, including satellites, terrestrial fiber optics, cable, or tape. Preferably, the received programming signals, are sent from some commercial source 105 to a video/audio/data encoding system 110 within uplink facility 100. Data signals such as electronic scheduling data for electronic program guides (EPG) and conditional access data for the received programming is generated within the uplink facility 100. In uplink facility 100, the collective data are digitally encoded and multiplexed into a packetized data bitstream using a number of conventional algorithms, including convolution error correction and compression, for example.

In a conventional manner, the encoded data bitstream is modulated and sent through an uplink frequency converter 115 which converts the modulated encoded data bitstream to a frequency band content signal suitable for reception by the satellite 200. The content signal representing the modulated, encoded data bitstream is then routed from the uplink frequency converter 115 to an uplink satellite antenna/dish 120, where it is broadcast toward the satellite 200 over the airlink 150. The content signal representing the encoded data bitstream may be encrypted and encoded, by a suitable encryption engine or scrambler 112 (dotted lines), or not encrypted and encoded.

The satellite 200 receives the modulated, encoded content signal via airlink 150, and re-broadcasts it downward via downlink 155 toward an area on earth that includes the various receiver stations (apparatus 300, for example). In this embodiment, the satellite dish (ODU 250) of apparatus 300 shifts the content signal (which may be a Ku-band signal for example) down to an L-band content signal which is transmitted via a LNB downconverter 160 to apparatus 300, for eventual reproduction on display monitor 370.

Front-end circuitry, which may or may not be part of apparatus 300, receives the L-band RF content signals from the LNB downconverter 160 and converts them back into the original digital data bitstream. The front-end circuitry may include a tuner or tuner-demodulator. Circuitry within apparatus 300 receives the original data bitstreams and performs digital processing operations such as de-multiplexing and video/audio decompression. The overall operation of apparatus 300, including the selection of parameters, the set-up and control of components, channel selection, a subscriber's conditional access to different program packages, and many other functions, both real time and non-real time, are controlled by a system chip within apparatus 300, as will be further explained below.

As defined hereafter, a channel represents a channel of entertainment content and may also be occasionally referred to as a program. As defined hereafter, a control word represents a key that is used for scrambling or descrambling of programming content, and specifically for each channel of programming content. Hence, a control word may also be occasionally referred to as a key.

As will be discussed in more detail below, the apparatus according to the embodiments of the present invention process content signals received from at least two or more different signal sources in one or more distribution systems. Preferably these signal sources may be from two or more networks in a satellite-based distribution system, such as content signals generated to subscribers from both a DIRECTV® network and a DISH Network®. The apparatus is not limited to satellite-based distribution systems such as DIRECTV® and ECHOSTAR® or others that operate in accordance with the DVB standard. Rather, the apparatus is configurable in cable-TV systems, off-air broadcast systems or any other known or future broadcast systems.

Figure 3:
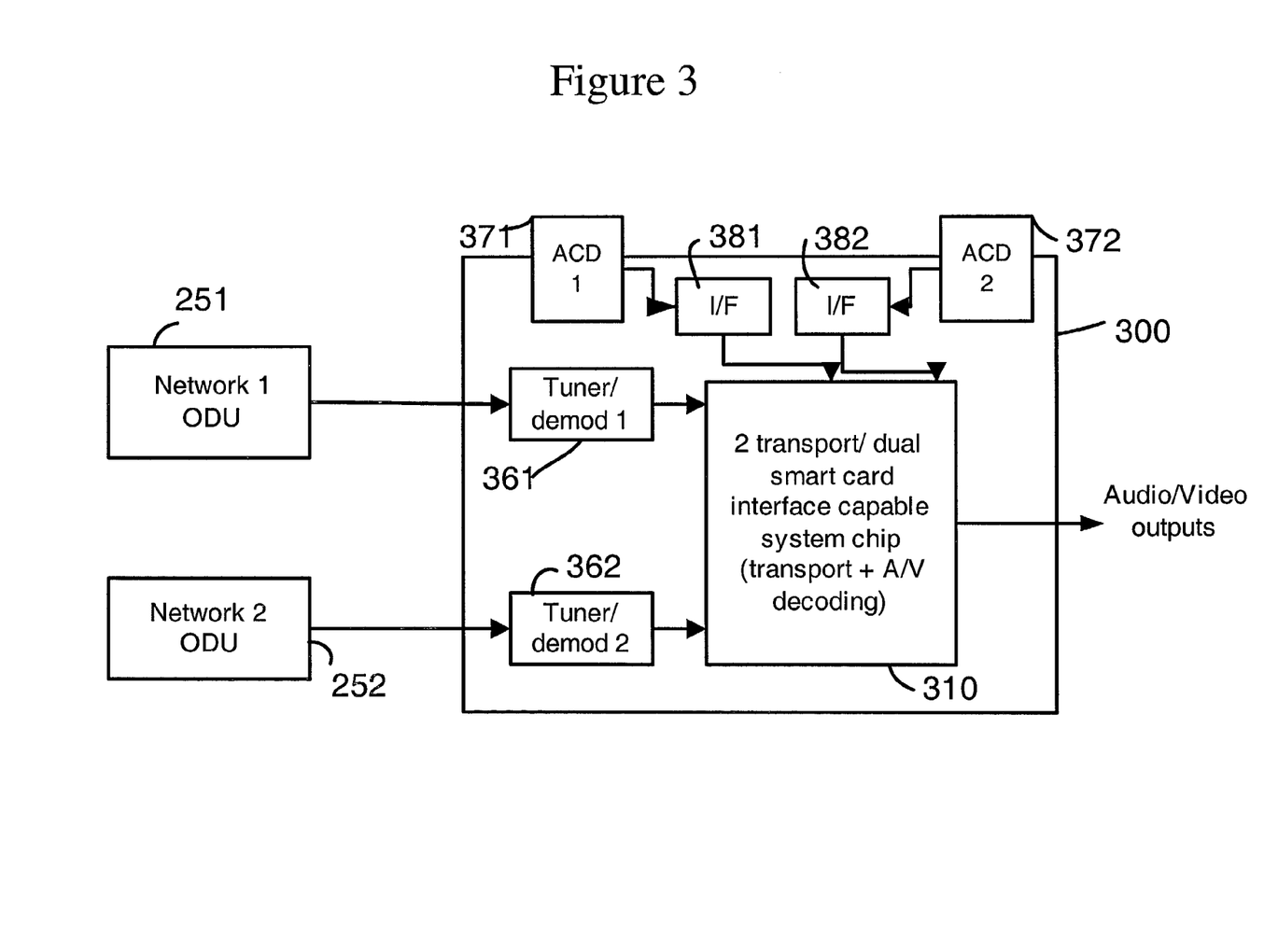
FIG. 3 illustrates further details of an embodiment of the apparatus shown in FIGS. 1 and 2 in accordance with the present invention.

FIG. 3 illustrates one embodiment of an apparatus in accordance with the invention. As shown in FIG. 3, apparatus 300 includes a system chip 310, tuner/demodulators 361 and 362, access control devices 371 and 372, and access control device interfaces (I/F) 381 and 382. In this embodiment, content signals from two separate signal sources, embodied as Network 1 and Network 2, are received via satellite 200, which may be one of a plurality of satellites, for example, by ODUs 251 and 252.

In this example, apparatus 300 is receiving content signals from two independent sources. Each ODU 251 and 252 send a continuous content signal or channel of programming to a corresponding tuner/demodulator 361, 362. The tuner/demodulator demodulates the content signal and converts it into a bitstream that may contain television programming and associated control data, including conditional access and program guide elements. Accordingly, bitstreams of two channels are continuously input to system chip 310.

The various functions of the system chip 310 may be distributed among multiple, discrete components. System chip 310 may be embodied as a high-speed processor including peripherals, etc. System chip 310 performs host processing functions, that is, non-real time functions such as graphical-user interface and browser functions for the subscriber. Additionally, system chip performs transport processing functions, such as demultiplexing of the A/V data flow, conditional access, program guide extraction, etc. System chip 310 also performs A/V decoding functions, so that the bitstream may be decoded, and converted into a signal for display on an output device.

Transport processing functions on system chip 310 may integrate system peripherals such as interrupts, timers, and memory controllers on-chip, including ROM, SDRAM, DMA controllers, a packet processor, crypto-logic, PCI compliant PC port, and parallel inputs and outputs. Additionally, system chip 310 may include or be operatively connected to, storage media such as SDRAM to support both host processing, transport processing and A/V decoding functions.

In this example, the system chip 310 is responsible for all command, control, and decoding functions. The system chip 310 performs essentially all of the real time operations, such as control of a data pipeline to the apparatus 300, conditional access processing, audio and video decoding, and gathering of electronic program guide information. Additionally, the system chip 310 controls essentially all non-real time functions that are executed within the apparatus, such as graphical user interface (GUI) and browser functions, for example. The system chip 310 selects one bitstream to process from one of the multiple signal sources, and performs further processing, including decoding and display of a audio/video output on a suitable output device as described below.

As described above, each signal source (e.g., network) has a headend configuration composed of at least a subscription management system, multiplexer, conditional access system and bitstream scrambler. Additionally, each network has a scrambling algorithm and a transport standard, and perhaps even unique elements in respective audio and video processing algorithms. Accordingly, the system chip 310 is configured to handle descrambling algorithms of both systems, and processing of bitstreams in accordance with both transport standards, so as to be able to decode and display a bitstream received by the apparatus from either network. Further, the apparatus 300 is configurable in a native mode of operation of either of the two networks, where one of the elements of the native mode is defined by the particular conditional access system used in the particular network. The other elements used to define the native mode may include the demodulation standards, the transport standards and the video standards of the particular network.

As further shown in FIG. 3, system chip 310 includes two transport processing sections, one each per network, and has a pair of access control devices 371, 372 and access control device interfaces 381, 382 connected thereto. Access control devices 371, 372 may be embodied as smart cards for example. However, a smart is only one exemplary embodiment of an access control device which can handle conditional access processing. The access control device 371 or 372 may be embodied as any component, hardware or software algorithm or process which may perform typical conditional access functions for subscriber management, including authentication, decryption and/or descrambling functions, to enable subscribers who have authorized access to selected programming or content the ability to view the selected programming.

The headend of each network may utilize conditional access elements generated by the network's conditional access system for subscription management and security purposes. The function of access control devices 371, 372 therefore is to enable a subscriber to receive channels he/she has subscribed to by allowing the channels to be descrambled. Accordingly, access control devices 371, 372 work in conjunction with a corresponding transport processing section in system chip 310 to monitor the conditional access elements in the bitstreams for the two networks. Access control devices 371, 372 also perform conditional access functions required for a subscribed-to channel to be descrambled by system chip 310 and processed for display.

The use of two access control devices interfaces 381 and 382 is preferable where bitstreams for both conditional access systems (of Network 1 and Network 2) need to be continuously monitored; thus in this respect the use of two access control devices interfaces is more convenient for the subscriber. Otherwise, only a single access control device interface is required at any one time.

A processor in the system chip 310, based on information received from each of the networks, builds a common electronic program guide containing channels from both networks. When a user pulls up an electronic program guide and selects a channel from one of the networks that feed the apparatus 300, one of tuner/demodulators 361, 362 tunes to the selected channel for the selected network and generates an audio/video output. This tuning process includes selection of the network whose bitstream needs to be further processed, tuning to the correct transponder on that network, demodulation of the bitstream corresponding to that transponder, demultiplexing and descrambling of the audio/video content for the channel tuned to (using elements of the conditional access system) and decoding the audio and video bitstreams for the particular channel to generate the audio/video output.

Figure 4:
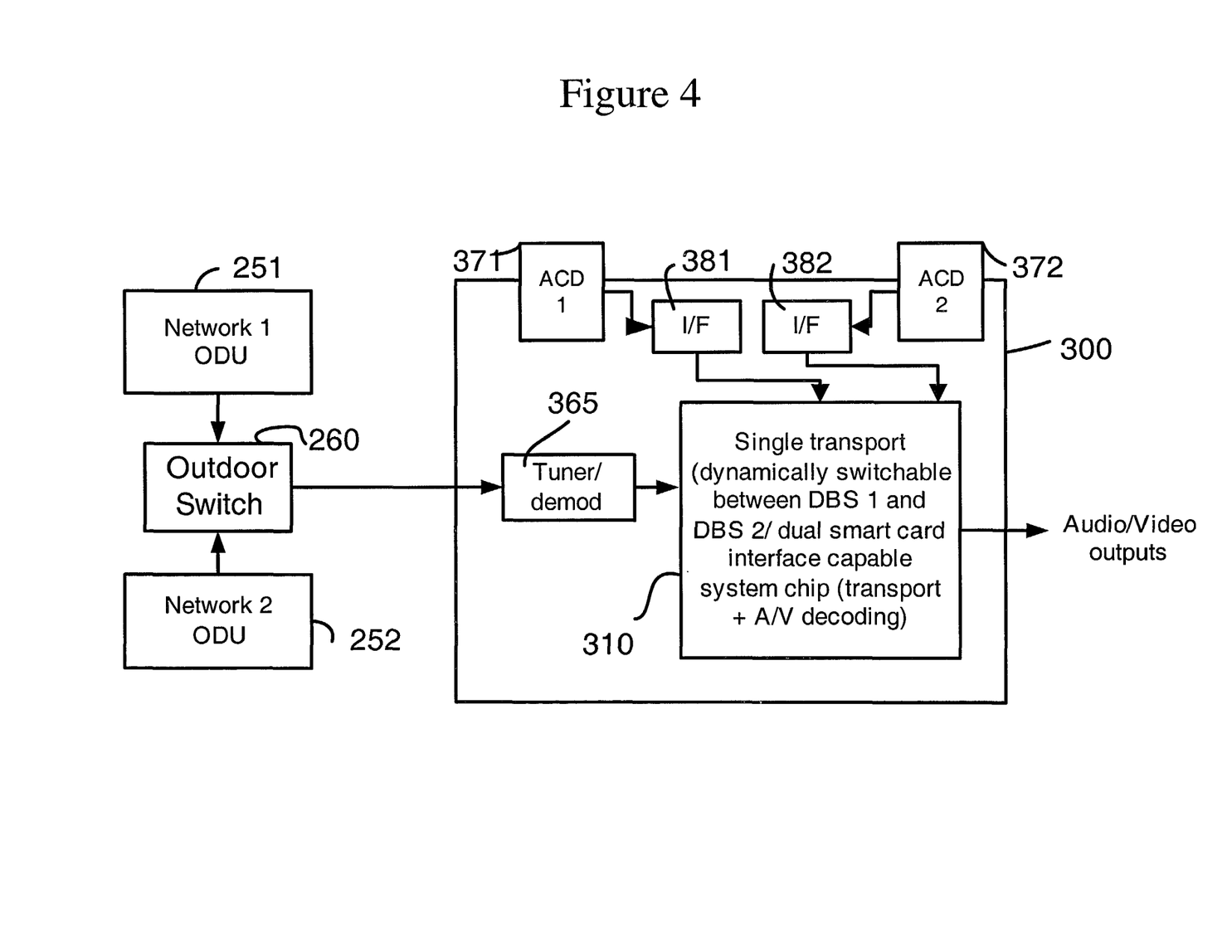
FIG. 4 illustrates another embodiment of the apparatus shown in FIGS. 1 and 2 in accordance with the invention.

FIG. 4 illustrates another embodiment of the apparatus in accordance with the invention. The apparatus shown in FIG. 4 is similar to that shown in FIG. 3, and description of the various elements is not repeated except for the differences. Apparatus 300 includes an outdoor switch 260, a single tuner/demodulator 365, and a system chip 310 that has a single transport processing section that is dynamically switchable between the two networks. This embodiment does not permit simultaneous monitoring of all input networks to apparatus 300.

As a consequence, there is a possibility that information from one network (including program guide data and conditional access information) will become old or "stale" if a user remains tuned to channels on the other network. Accordingly, the operation of apparatus 300 in this embodiment is enhanced by cooperation between networks at the headend side of the satellite-based distribution system. It is particularly desirable for the networks to share program guide information of channels that are to be shared by the two networks. Accordingly, system chip 310 of apparatus 300 is configured to receive merged program guide data of channels of two or more networks for display as a single electronic program guide. Similar to the previous embodiment, this embodiment requires two access control devices for the two conditional access systems.

Outdoor switch 260 is embodied as a multiswitch which can be of the type known in the art. The outdoor switch 260 enables apparatus 300 to switch signal feed between ODU 251 and ODU 252. Since only a single tuner/demodulator 365 is present, apparatus 300 can receive only one content signal (channel) at a time. However, as noted above, two access control devices are still provided to process the conditional access information for each of the networks, so that the received bitstream may be descrambled and processed for display. The multiswitch enables the apparatus to switch signal feed thereto between the two ODUs, thereby receiving only a single content signal or channel at a time. The multiswitch may be a standalone component or embedded in one of the ODUs. Accordingly, the apparatus 300 is capable of receiving programming from two signal sources simultaneously, and is also capable of merging or presenting a combined electronic program guide (EPG) for display on a subscriber's output device. Accordingly, the subscriber may have access to programming from multiple networks, for example.

That is, the embodiment shown in FIG. 4 simplifies the merging of electronic program guides (EPG) from two or more signal sources, if the two networks cooperate in terms of broadcasting program guide information. This is explained using the following example.

Network 1 has an NFL Sunday football package available to its subscribers. Subscribers of Network 2 do not, but they desire access to the NFL package. However, because Network 2 carries and thus broadcasts the programming guide information of Network 1 for the NFL channels along with its own programming guide information to its subscribers, a subscriber of Network 2 will have the option of selecting the NFL Sunday football package from the program guide. When the subscriber to Network 2 selects a channel from the NFL package from his EPG, the system tunes to Network 1 and receives the programming from Network 1. The audio and video bitstreams for the channel on Network 1 are descrambled using conditional access elements for the conditional access system of Network 1, including the access control device that works with the conditional access system of Network 1. Accordingly, a user who receives content from Network 2 can now also receive the NFL package.

Figure 5:
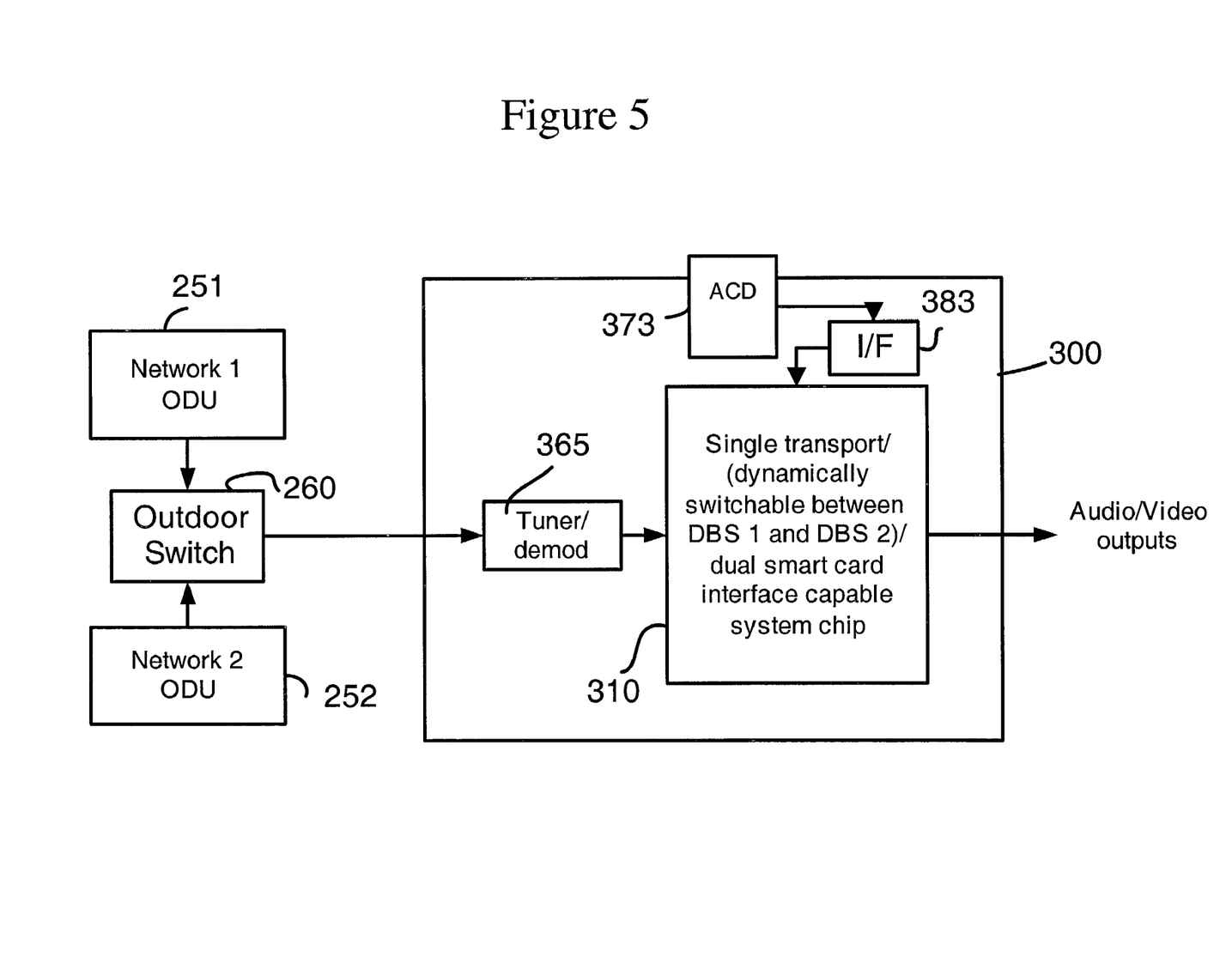
FIG. 5 illustrates a further embodiment of the apparatus shown in FIGS. 1 and 2 in accordance with the invention.

FIG. 5 illustrates a further embodiment of the apparatus in accordance with the invention. The embodiment shown in FIG. 5 is identical to that shown in FIG. 4 with the exception that only one access control device 373 and one access control device interface 383 are required. Similar to FIG. 4, apparatus 300 of FIG. 5 is configured so as to merge EPGs, but also is adapted in accordance with the simulcrypt feature according to an embodiment of the present invention.

Similar to the embodiment shown in FIG. 4, there is the assumption of cooperation between networks at the headend side of the system. However, in this embodiment, and in addition to cooperation at the program guide level, there is cooperation between the networks at the conditional access level via a simulcrypt feature. Simulcrypt allows the use of only one conditional access system on the apparatus 300, and consequently requires only one access control device in the apparatus 300.

The apparatus 300 can thus support processing programming from both signal sources by taking advantage of a simulcrypt feature at the headend(s) of the respective signal sources. The simulcrypt feature enables control words for the conditional access system of channels in a first network to be dynamically translated to the domain of the other network, for transmission along with programming information of the first network in the second network.

The simulcrypt feature further allows the use of a single conditional access system in the apparatus, regardless of which system's signal is being processed in the apparatus. In other words, although the apparatus 300 may be processing the scrambling algorithm and transport standards of both networks, the control words for descrambling are received using only one conditional access system. However, the present invention is not limited to using only one conditional access system; either conditional access system could be used.

Figure 6:
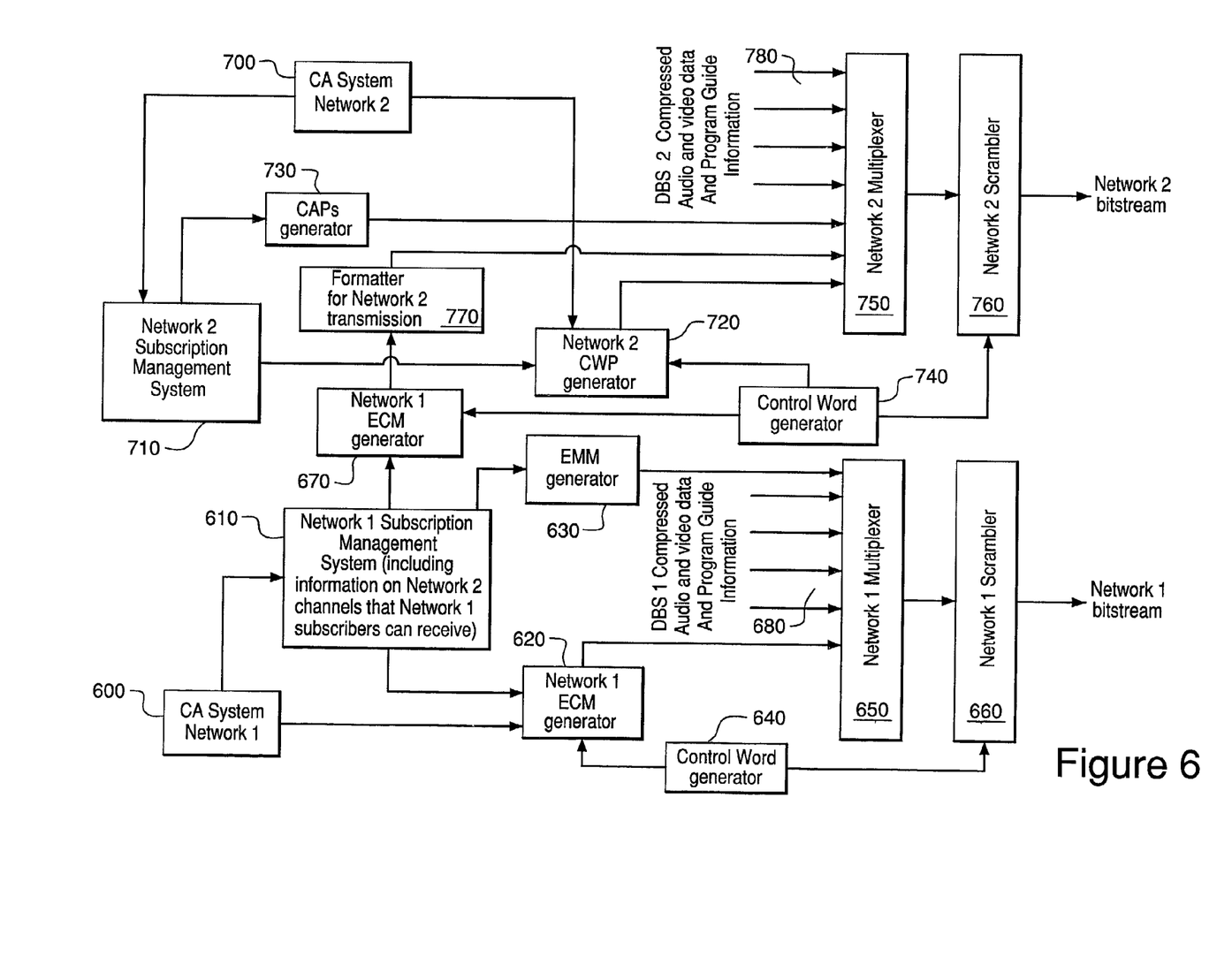
FIG. 6 illustrates an exemplary headend configuration that can be employed in the system shown in FIGS. 1 and 2 according to an embodiment of the present invention.

FIG. 6 illustrates an exemplary headend configuration side of the system in accordance with an embodiment of the present invention. Specifically, FIG. 6 provides a more detailed illustration of the headend configuration initially discussed briefly with respect to FIG. 1.

As illustrated, each Network 1 and Network 2 has a subscription management system, conditional access system, multiplexer and scrambler in order to generate corresponding bitstreams of compressed and encoded audio and video data that is to converted into a content signal for transmission to satellite 200, to be received by ODU 251 or 252. Additionally, each network 1 and 2 has its own scrambling algorithm and transport standard. Accordingly, the system chip 310 is capable of handling descrambling of both algorithms and processing of bitstreams in accordance with both transport standards, so as to be able to decode and display a bitstream received by the apparatus 300 from either Network 1 or 2. The ability of the satellite-based distribution system of the invention to process bitstreams with different transport standards, scrambling algorithms and perhaps even with variations in video processing is made possible by this invention.

As further shown in FIG. 6, the headend of network 1 includes conditional access (CA) system 600, subscription management system 610, ECM generators 620 and 670, EMM generator 630, control word generator 640, multiplexer 650 and scrambler 660. Similarly, the headend of network 2 includes CA system 700, subscription management system 710, CWP generator 720, CAP generator 730, control word generator 740, multiplexer 750, scrambler 760 and a formatter 770 for transmission.

CA system 600 generates the conditional access bitstreams that will be used in the network and can provide the conditional access element to the subscription management system 610 and/or ECM generator 620. Subscription management system 610 manages each subscriber's subscription, and controls generation of EMMs, entitlement management messages, by EMM generator 630. An EMM contains the subscription information for channels that each subscriber may receive, and is received in the Network 1 bitstream.

The ECM generator 620 generates an entitlement control message (ECM). The ECM provides a means of getting the encrypted control words (keys) to the apparatus 300, to inform the apparatus 300 as to how the bitstream can be descrambled. In a particular embodiment, the access control device decrypts the keys required for descrambling the bitstream, and the system chip 310 descrambles and decodes the corresponding content (e.g., the audio and video bitstreams). It can also be noted that the key for audio data can be different from the key for video data. ECM generator 620 may also serve the function of formatting the ECM for transmission, such as in a packetized form suitable for the network. Alternatively, this may be done at multiplexer 650. As shown in the figure, in some embodiments, the ECM optionally may be generated by also using subscription information.

Control word generator 640 generates control words (or keys) for the programming content, and specifically for each channel of programming content. The audio and video bitstreams for the channel (program) are encrypted at scrambler 660 using the control words (keys). As explained above, the control words (keys) are protected (via encryption) and transmitted as ECMs. Control words may be dynamic. Control words are associated with channels in the digital sense, i.e., there are many channels on a transponder. Also a different control word may be used for the audio and video portions of the digital channel.

Multiplexer 650 combines the EMMs, ECMs, program guide information, and the compressed audio and video data 680 which is the entertainment portion of the programming content into a single data structure. The data 680 shown here is the same encoded data that is output from encryption engine 112 in the uplink facility 100 of FIG. 2. In the exemplary embodiment, the multiplexed data structure may be embodied as a data packet representing the bitstream that is to be converted into a content signal at the uplink frequency converter 115 in FIG. 2 for transmission via dish 120 to satellite 200, and eventually to ODUs 251 and 252.

Network 2 is structurally similar to Network 1, although the protocol used by, or the domain of, Network 2, is assumed to be somewhat different than Network 1. Accordingly, and for reasons of clarity, CA system 700 is functionally equivalent to CA system 600; subscription management system 710 is functionally equivalent to subscription management system 610, CWP generator 720 is functionally equivalent to ECM generator 620; CAP generator 630 and EMM generator 730 are functionally equivalent, as are the control word generators, multiplexers, scramblers and compressed audio and video data in each of Network 1 and Network 2.

In order to effect the simulcrypt feature so that apparatus 300 can process content signals received from either network, a subscription management system in one network contains subscription information of channels in the other network that the subscribers of the first network can receive. In the exemplary embodiment of FIG. 6, subscription management system 610 of Network 1 contains this data. Accordingly, Network 1 has an additional ECM generator 670 that is in communication with control word generator 740 and a formatter 770.

In one aspect, ECM generator 670 enables control words for Network 2 channels that need to be received by Network 1 subscribers to be dynamically translated into the Network 1 conditional access (CA) domain suitable for transmission on Network 2. This data is transmitted along with Network 2 bitstreams. Additionally, EMM information in Network 1 for these channels may be translated into CAPs and transmitted over Network 2 transponders.

Although not shown in FIG. 6 for reasons of clarity, control words for Network 1 channels that are to be received by Network 2 subscribers could be dynamically translated into the Network 1 CA domain for transmission on Network 1, and this data is transmitted along with Network 1 bitstreams as a data packet. CAP information for these channels may be translated into EMMs and transmitted over Network 1 transponders.

The operation of the simulcrypt feature utilizing apparatus 300 of FIG. 5 and headend configuration of FIG. 6 is now explained using an example. Taking the abovementioned example of the NFL package, to enable a subscriber of Network 1 to receive the NFL channels that are on Network 2, the keys (generated by the control word generator 740) for Network 2 are transmitted using the CA system 600 of Network 1. Specifically, CA elements from CA 600 are used to generate the ECM in ECM generator 670 that is generated based on the key received from control word generator 740. The key is encoded into an ECM. The ECM is transmitted with the program on Network 2.

As a result, although the channel belongs to Network 2, the keys for descrambling these channels for subscribers of Network 1 are made available to the apparatus 300 via Network 2. This concept is called simulcrypt. In this example, a subscriber of Network 1 can thus receive channels that are provided by Network 2, but a subscriber of Network 2 cannot receive channels provided by Network 1.

Furthermore, CA information of Network 1 may be transmitted on Network 2 to prevent CA information about Network 1 from becoming stale on the apparatus 300 while the user is tuned to any of the NFL package channels on Network 2.

Accordingly, apparatus 300 is configurable in a native mode of operation of either of the two networks, the native mode being defined by the particular CA system 600 or 700 in the headend configuration of the particular network. The native mode is not limited to the respective CA systems, and may be defined by the respective transport standards and/or audio/video standards of either network.

Moreover, the simulcrypt feature provides an apparatus 300 that may be fixed to two or more scrambling algorithm standards, and two or more transport standards, since the CA domain is dynamically translated at the headend side of the system.

The invention being thus described, it will be obvious that the same may be varied in many ways. For example, the functional blocks in FIGS. 1-6 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

What is claimed is:

1. An apparatus for processing content signals, comprising:
at least one tuner/demodulator, adapted to receive content signals transmitted from a first satellite network broadcasting a first content signal and a second satellite network broadcasting a second content signal, and to demodulate the received content signals as bitstreams;
at least one access control device for supporting at least one conditional access system of said first and second satellite sources that is associated with the received and demodulated bitstreams, wherein the first content signal transmitted from the first satellite network comprises a control word for the first satellite network encrypted using encoding from the second satellite network; and
a processor, adapted to process the control word in accordance with the conditional access to enable display of the demodulated bitstreams on an output device.

2. The apparatus of claim 1, wherein said at least one tuner/demodulator is adapted to receive said content signals from said first and second satellite networks as provided by separate first and second direct broadcast satellite networks in a satellite-based distribution system.

3. The apparatus of claim 2, wherein each of said first and second networks has a headend configuration comprising at least a subscription management system, multiplexer, conditional access system and scrambler.

4. The apparatus of claim 3, wherein each said network performs a scrambling algorithm and a transport standard, and said processor is adapted to descramble the bitstreams scrambled by each algorithm and process programming bitstreams in accordance with each transport standard.

5. The apparatus of claim 2, the apparatus being configured in a native mode of operation of either of the two networks, the native mode being defined by at least one of the conditional access system, transport standard and audio/video standard of either network, such that the processor is adapted to process bitstreams from either network regardless of the processor's native mode of operation.

6. The apparatus of claim 2, wherein each network includes a headend configuration comprising at least a subscription management system, multiplexer and scrambler, such that a subscription management system of one network contains information on channels of the other network to which subscribers of the one network have access.

7. The apparatus of claim 2, wherein at least one said access control device is dedicated to each network to enable descrambling of a corresponding bitstream.

8. The apparatus of claim 2, wherein a single access control device is adapted to decrypt at least one access key associated with a particular type of program data.

9. The apparatus of claim 2, wherein a single said access control device is adapted to descramble a corresponding bitstream.

10. The apparatus of claim 2, wherein at least one said tuner/demodulator is dedicated to each network to receive said content signals and demodulate the received content signals as bitstreams.

11. The apparatus of claim 2, wherein a single said tuner/demodulator is adapted to receive said content signals from a selected one of the networks, and to demodulate the selected content signals as bitstreams.

12. The apparatus of claim 2, further comprising:
a pair of outdoor units (ODUs), adapted to receive the content signals from the networks such that a first ODU receives the content signals from the first network, and a second ODU receives the content signals from the second network.

13. The apparatus of claim 12, further comprising:
a switch, operatively connected to the first and second ODUs, and adapted to enable the apparatus to switch signal feed thereto between the ODUs.

14. The apparatus of claim 13, wherein the switch includes a standalone multiswitch or is embedded in one of the two ODUs or is included in the apparatus.

15. The apparatus of claim 1, wherein the processor further includes at least one access control device interface for determining if descrambling of a bitstream is required.

16. The apparatus of claim 15, wherein the processor is adapted to include two said access control device interfaces to descramble bitstreams of said first and second satellite networks which are subject to conditional access requiring constant monitoring.

17. The apparatus of claim 1, wherein said processor is adapted to perform command and control functions based on instructions embedded in the received content signals, and transport processing of the bitstreams, including descrambling and decoding the bitstreams for display of electronic program guide data and entertainment programs.

18. The apparatus of claim 2, wherein said processor is adapted to merge program guide data of said two networks for display as a single electronic program guide.

19. The apparatus of claim 1, wherein said apparatus includes at least two of said tuner/demodulators, configured in either of the following manners:
at least one of said tuner/demodulators is adapted to support simultaneously receiving content signals transmitted continuously from said first and second satellite networks; and
one of said tuner/demodulators is adapted to receive those of said content signals received from one of the first or second satellite networks during one period of time, and the other of said tuner/demodulators is adapted to receive other of said content signals received from the other one of the first or second satellite networks during another period of time.

20. The apparatus of claim 1, wherein said processor comprises:
at least one access control device interface, adapted to perform conditional access processing on the two received and demodulated bitstreams; and
a dynamically switchable processing section for switching between said first and second satellite networks to process a corresponding demodulated bitstream for display on said output device.

21. The apparatus of claim 1, comprising two of said access control devices, each being adapted to a supporting a said conditional access system of a respective one of the first and second satellite networks that is associated with the received and demodulated bitstreams.

22. A satellite-based distribution system, comprising:
a first satellite network broadcasting a first content signal for transmitting first programming and a second satellite network broadcasting a second content signal for transmitting second programming to corresponding subscribers; and
an apparatus, adapted to process the first and second broadcast content signals, the apparatus including:
at least one tuner/demodulator, adapted to receive said content signals and demodulating the received content signals as bitstreams;
at least one access control device, adapted to supporting at least one conditional access system of said first and second satellite networks that is associated with the received and demodulated programming bitstreams, wherein the first content signal transmitted from the first satellite network comprises a control word for the first satellite network encrypted using encoding from the second satellite network; and
a processor, adapted to process the control word in accordance with the conditional access to enable display of the demodulated bitstreams on an output device.

23. The system of claim 22, wherein the apparatus is configured so as to support simultaneously receiving said content signals transmitted continuously from said first and second satellite networks.

24. The system of claim 22, wherein the processor is adapted to receive said content signal from only one of the first and second satellite networks at a time.

25. A method for processing content signals received in satellite-based distribution system, comprising:
receiving at least a first content signal transmitted from a first satellite network, comprising first programming;
receiving second content signal transmitted from a second satellite network, comprising second programming;
demodulating the received first and second content signals as bitstreams, wherein the first content signal transmitted from the first satellite network comprises a control word for the first satellite network encrypted using encoding from the second satellite network;
performing conditional access processing according to the control word on at least one of the received and demodulated programming bitstreams; and
processing the demodulated and conditional access processed bitstreams for display.

26. The method of claim 25, wherein said receiving receives said first and second content signals from said first and second satellite networks as provided by separate first and second direct broadcast satellite networks in a satellite-based distribution system.

27. The method of claim 26, wherein each of said first and second satellite networks has a headend configuration comprising at least a subscription management system, multiplexer, conditional access system and scrambler.

28. The method of claim 27, wherein:
each said satellite network performs a scrambling algorithm and a transport standard; and said processing includes descrambling the bitstreams scrambled by each algorithm and process programming bitstreams in accordance with each transport standard.

29. The method of claim 26, wherein each satellite network includes a headend configuration comprising at least a subscription management system, multiplexer and scrambler, such that a subscription management system of one network contains information on channels of the other network to which subscribers of the one network have access.

30. The method of claim 26, wherein said performing conditional access processing step comprises:
using at least one said access control device dedicated to each satellite network to descramble a corresponding bitstream.

31. The method of claim 26, wherein said performing conditional access processing step comprising:
using a single access control device to decrypt at least one access key associated with a particular type of program data.

32. The method of claim 26, wherein said performing conditional access processing step comprises:
using a single said access control device is adapted to descramble a corresponding bitstream.

33. The method of claim 26, wherein said demodulating step comprises:
using at least one said tuner/demodulator, dedicated to each satellite network to receive said content signals and demodulate the received content signals as bitstreams.

34. The method of claim 26, wherein:
said receiving step includes using a single said tuner/demodulator to receive said content signals from a selected one of the satellite networks; and
said demodulating step includes using said single tuner/demodulator to demodulate the selected content signals as bitstreams.

35. The method of claim 26, wherein:
said receiving receives the content signals from the satellite networks such that a first outdoor unit (ODU) receives the first contents signals from the first satellite network, and a second ODU receives the second content signals from the second satellite network.

36. The method of claim 26, wherein:
said processing includes performing command and control functions based on instructions embedded in the received content signals, and transport processing of the bitstreams, including descrambling and decoding the bitstreams for display of electronic program guide data and entertainment programs.

37. The method of claim 26, wherein said processing merges program guide data of said first and second networks for display as a single electronic program guide.

38. The method of claim 25, wherein:
said processing includes dynamically switching between said first and second satellite networks to process a corresponding demodulated bitstream for display on said output device.

39. A method for operating a satellite-based distribution system, comprising:
controlling a first satellite network to transmit first content signals comprising first programming to corresponding subscribers;
controlling a second satellite network to transmit second content signals comprising second programming to the corresponding subscribers; and
controlling a receiving apparatus to perform the following operations:
receiving the first and second content signals transmitted from the first and second satellite networks;
demodulating the received content signals as bitstreams; wherein the first content signals transmitted from the first satellite network comprise a control word for the first satellite network encrypted using encoding from the second satellite network;
removing any conditional access encoding of the second satellite network present in the received and demodulated programming bitstreams of the first content signals received from the first satellite network; and
processing the demodulated bitstreams for display.

40. The method of claim 39, wherein said receiving simultaneously receives content signals transmitted continuously from said first and second satellite networks.

41. The method of claim 39, wherein the processing processes said content signals from only one of the first and second satellite networks at a time.

42. A direct-broadcast satellite system, comprising:
a first satellite network to broadcast a first content signal comprising first programming encrypted using a first control word to a plurality of subscribers;
a second satellite network to broadcast a second content signal comprising second programming encrypted using a second control word to the plurality of subscribers, wherein the second programming may at least partially overlap the first programming;
a subscription management system to determine subscription information for the plurality of subscribers, to generate a the second control word, to generate an entitlement control message based on the second control word for broadcast in the first content signal, and to transmit the first content signal including the entitlement control message via the first satellite network; and
an apparatus, adapted to process the transmitted content signals, the apparatus including:
at least one tuner/demodulator, adapted to receive the first and second content signals and demodulating the received content signals as bitstreams;
at least one access control device, adapted to supporting at least one conditional access system of the first and second satellite networks that is associated with the received and demodulated programming bitstreams, and to decrypt the first content signal using the entitlement control message and the second control word; and
a processor, adapted to process the demodulated bitstreams for display on a suitable output device in accordance with the conditional access.

* * * * *